United States Patent [19]

Solomon

[11] Patent Number: 4,903,339
[45] Date of Patent: Feb. 20, 1990

[54] LOCALLY NULLED SINE-WAVE TOTAL POWER ALARM FOR INTRUSION DETECTING OPTICAL COMMUNICATIONS SYSTEMS

[75] Inventor: Harvey E. Solomon, Highland, Md.

[73] Assignee: The United States of America as represented by the Director, National Security Agency, Fort George G. Meade, Md.

[21] Appl. No.: 209,144

[22] Filed: Jun. 16, 1988

[51] Int. Cl.[4] .............................................. H04B 9/00
[52] U.S. Cl. ................................................... 455/612
[58] Field of Search ............... 455/600, 606, 607, 608, 455/609, 610, 611, 612, 613, 617, 618, 619; 370/1, 3, 4; 379/7, 35

[56] References Cited

U.S. PATENT DOCUMENTS 4,000,416 12/1976 Goell ..................................... 455/612
4,144,530 3/1979 Redfern ................................ 455/612
4,207,561 1/1980 Steensma ............................. 455/612
4,217,488 8/1980 Hubbard et al. .................... 455/612
4,399,565 8/1983 Jarret ................................... 455/612
4,435,850 3/1984 Bowen et al. ....................... 455/612

Primary Examiner—Robert L. Griffin
Assistant Examiner—L. Van Beek
Attorney, Agent, or Firm—Thomas O. Maser; John R. Utermohle

[57] ABSTRACT

An intrusion detection optical communication system modifies the original data signal to include a synchronizing periodic waveform. The receiver generates an inverted synchronizing periodic waveform signal corresponding with the transmitted signal to null the same under normal operation. When an intrusion in the optical system arises, power is extracted from the system and the nulled condition is disrupted. The disruption is detected and activates an alarm circuit when the disruption is above a threshold value.

15 Claims, 1 Drawing Sheet

LOCALLY NULLED SINE-WAVE TOTAL POWER ALARM FOR INTRUSION DETECTING OPTICAL COMMUNICATIONS SYSTEMS

BACKGROUND OF THE INVENTION

The invention relates to a system for detecting an unauthorized attempt to tap the optical fiber of an optical communications system. Tapping an optical fiber line usually requires extracting some power from it. Conventional tap detectors measure the received power and produce an alarm if the received power is less than expected. The present invention improves upon prior optical fiber tap detectors by modifying the original data signal such that the transmitted signal includes synchronizing periodic waveform information as well as a fixed total power. The synchronizing information is detected in the receiver and used to produce a local signal which is combined with the transmitted signal. When the combined signal is out-of-balance as a result of extraction of power due to tapping of the optical fiber, an alarm is activated.

BRIEF DESCRIPTION OF THE PRIOR ART

As set forth above, intrusion detection optical systems are known in the prior art as evidenced by the U.S. Pat. No. 4,435,850 to Bowen et al and Steensma U.S. Pat. No. 4,207,561. The Bowen et al patent, for example, discloses a secure fiber optic data transmission system wherein a data signal is modulated onto a constant power reference signal. Detection and alarm circuitry is provided in the receiver. The alarm is triggered when the detected reference signal power is above or below a predetermined threshold. The Steensma patent discloses an optical communication system including means in the transmitter for detecting intrusion. The transmitted signal is reflected from the receiver back through the optical fiber to the transmitter where it is correlated with the original. An alarm is triggered when the correlator output falls below a given value. It is also known in the art to optically transmit a data signal with a reference signal produced by a voltage-controlled oscillator as shown in the U.S. patent to Crochet et al U.S. Pat. No. 4,249,764.

While the prior devices normally operate satisfactorily, they are generally characterized by an alarm "window", whereby changes in the transmitted signal as a result of instrusion must be significant in order to be detected. Moreover, the size of the window depends on the stabilities of the transmitter, fiber, and avalanche photodiode (APD) receiver. Since the APD is the least stable component, expensive steps must be taken to stabilize the APD, thereby increasing the cost and complexity of the prior devices.

The present invention was developed in order to overcome these and other drawbacks of the prior devices by providing a locally nulled periodic subcarrier power alarm for optical communication systems.

SUMMARY OF THE INVENTION

Accordingly, it is a primary object of the present invention to provide an improved intrusion detection optical system including a transmitter for generating a combined multiplexed data and periodic subcarrier alarm waveform optical signal, an optical fiber for transmitting the combined signal, and a receiver connected with the fiber for receiving the combined signal. The receiver includes a local signal generator which generates a local optical signal including a periodic wave component matched with the periodic subcarrier alarm waveform of the transmitted combined signal. An avalance photodiode combines the transmitted and local optical signals to produce a composite output signal. A bandpass filter is connected with the output of the avalanche photodiode and passes only non-zero periodic wave components from the composite output signal. Any non-zero wave components above a threshold value are detected by a synchronous detector connected with the bandpass filter to indicate an intrusion into the optical fiber.

According to a more specific object of the invention, the periodic waveform comprises a sine wave. More particularly, the transmitter includes a first oscillator for producing sine wave sync signal multiplexed with the data to be transmitted via the optical fiber and a sine wave signal combined with the multiplexed data signal for transmission therewith. The receiver also includes an oscillator which receives the transmitted sine wave sync signal and generates a sine wave for addition to the local optical signal which is matched in frequency and phase to the sine wave signal from the transmitter.

According to yet another object of the invention, power sources are provided in both the transmitter and receiver to provide power to the transmitted and local signals.

It is yet another object of the invention to provide an intrusion detection of optical communication system whcih is capable of duplex operation with alarm activated data shutoff.

BRIEF DESCRIPTION OF THE FIGURES

Other objects and advantages of the invention will become apparent from a study of the following specification, when viewed in the light of the accompany drawing, in which.

DETAILED DESCRIPTION

Figure 1:
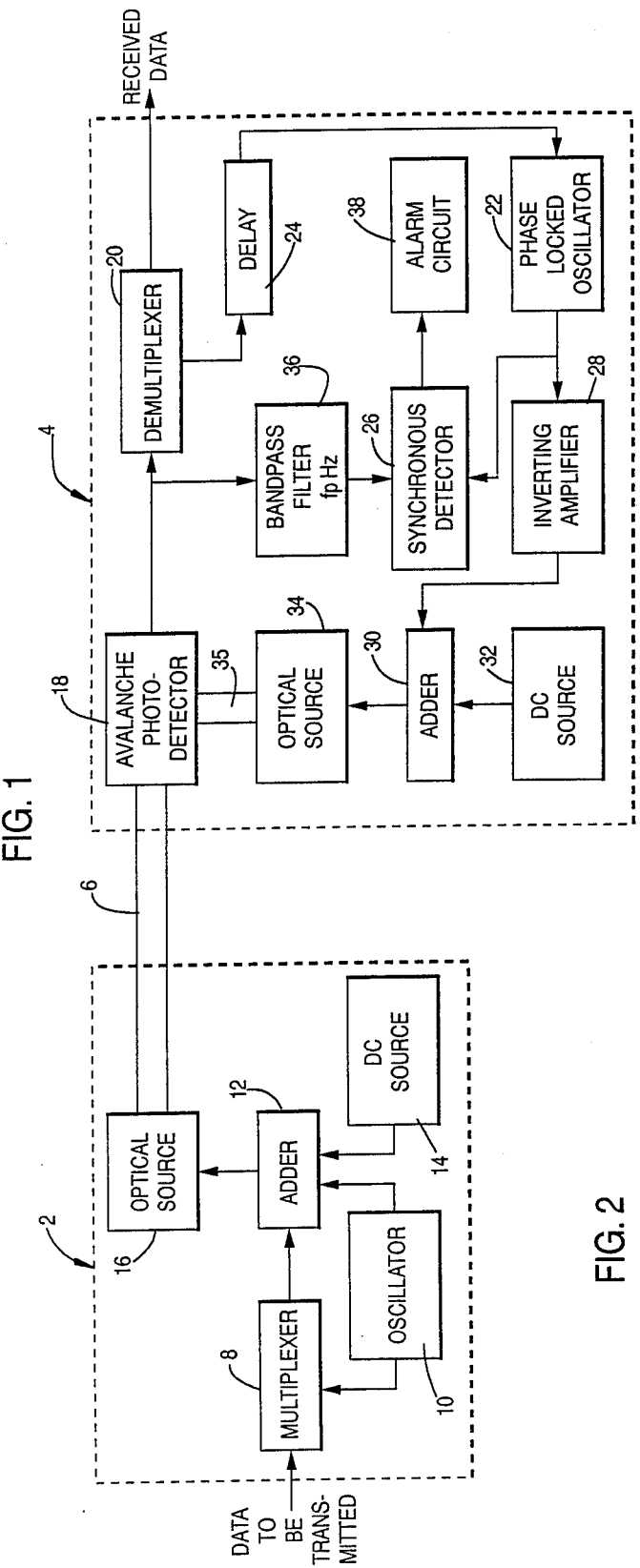
FIG. 1 is a block diagram of the intrusion detection optical, communication system according to the invention.

Referring first to FIG. 1, the improved intrusion detection optical communication system comprises a transmitter 2, a receiver 4, and an optical fiber 6 connected therebetween. Data to be transmitted, which may be in either analog or digital form, is delivered to a mutiplexer 8 within the transmitter where the data is multiplexed with a sync signal generated by an oscillator 10. The multiplexer 8 may operate in either the time or frequency domain.

The oscillator 10 also generates a periodic waveform, and more particularly a sine wave, which is delivered to an adder 12. As shown in the drawing, the output from the multiplexer is connected with the adder, as is the power output from a DC source 14. The adder combines the multiplexed sync and data signal form the multiplexer 8, the DC source 14 and the sine wave signal from the oscillator 10 to produce a data and sine wave output signal. This output signal, which is in electrical form, is delivered to an optical source 16 where it is converted to an optical format. The combined optical output signal is transmitted to the receiver 4 via the optical fiber 6 connected with the transmitter optical source 16.

The sine wave generated by the oscillator 10 has a frequency $f_p$ measured by Hertz. The output of the oscillator is thus expressed as A. Sin $(2\pi f_p t)$ The multiplexed data signal from the multiplexer 8 may be expressed as s(t). Accordingly, the optical intensity of the transmitter output signal may be expressed mathematically as $$I_f(t) = C + Cm_p \text{ Sin } (w_p t) + S \, s(t)$$

where

C and S are non-negative constants;

$m_p$ ($0 < m_p \leq 1$) is the alarm modulation index; and $w_p = 2\pi f_p$.

Within the receiver 4, the other end of the optical fiber is connected with an avalanche photodetector (APD) 18 which passes the received optical signal from the transmitter to a demultiplexer 20 to demultiplex the data portion of the receive signal from the sine wave sync signals. The demultiplexer may also operate in the time or frequency domain in accordance with the domain of operation of the transmitter multiplexer 8. One output of the demultiplexer delivers the received data, while the other output of the demultiplexer is arranged in a feedback circuit for detecting a tap or intrusion into the optical fiber as will be set forth in greater detail below.

The sine wave sync portions of the received optical signal are delivered to a phase locked oscillator 22 via a delay circuit 24. The oscillator 22 generates a sine wave that is matched in frequency and phase to the sin $(w_p t)$ component of the transmitted signal $I_f(t)$. The sine wave output of the phased locked oscillator 22 is coupled to the reference input of a synchronous detector 26 as will be discussed in greater detail below. The output of the oscillator 22 is also coupled to the input of an inverting amplifier 28 having unity gain, whereby the output of the amplifier is equal in magnitude but opposite in sign to its input. The amplifier output is connected with a receiver adder 30 as is the power output from a DC source 34. The electrical output from the adder 30 drives an optical source 34 which converts the intensity modulated adder output to optical form, whereby a local or feedback intensity modulated optical signal is delivered to the avalanche photodiode 18 via an optical fiber 35. This local optical intensity signal can be written mathematically as $$I_n(t) = C_n - C_n m_n \text{ Sin } (w_p t)$$

where $C_n$ is a non-negative constant; and $m_n$ ($0 < m_n \leq 1$) is its modulation index.

The avalanche photodetector 18 combines the transmitted and local signals $I_f(t)$ and $I_n(t)$ to produce an electrical output $I_r(t)$ as follows:

$$\begin{aligned} I_r(t) &= I_f(t) + I_n(t) \\ &= C + C_n + (Cm_p - C_n m_n) \text{ Sin } (w_p t) + S \, s(t). \end{aligned}$$

In normal operation where there is no intrusion or tapping of the optical fiber 6, the parameters C, $m_p$, $C_n$, and $m_n$ are adjusted to make $$Cm_p = C_n m_p$$

which nulls the Sin $(w_p t)$ component of $I_r(t)$.

The output of the avalanche photodiode is delivered to a narrow bandpass filter 36 having a passband centered at frequency $f_p$. The filter 36 is operable to block all signals except any non-zero sin $(w_p t)$ component which is passed to an input of the synchronous detector 26.

Under normal (i.e. non-intrusive) operation where the Sin $(w_p t)$ component of $I_r(t)$ is nulled, the output of the bandpass filter is zero. This is sensed by the synchronous detector whose output thus is also zero.

On the other hand, if a tap is present on the fiber 6, some of the power propagating within the fiber is extracted, and the parameter C is reduced which disrupts the null condition set forth above. The resultant non-zero Sin $(w_p t)$ component of $I_r(t)$ from the avalanche photodiode 18 passed through the bandpass filter 36 to the synchronous detector 26. Since the reference input of the synchronous detector is always non-zero (i.e. the output of the phase locked oscillator 22), the DC ouput of the detector is non-zero. When the magnitude of this output exceeds a given threshold value, an alarm circuit 38 is activated to indicate the intrusion into the fiber of the optical communication system.

Figure 2:
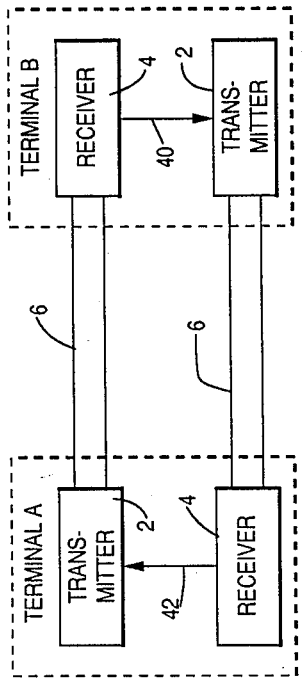
FIG. 2 is a block diagram of the invention for use in a duplex mode of operation.

Duplex operation with alarm activated data shutoff can be implemented as shown in FIG. 2. The activation of the alarm 40 in terminal B terminates the data transmission from terminal B to terminal A. This activates the alarm 42 in terminal A which terminates data transmission from terminal A to terminal B. Similar results occur if the alarm in terminal A is activated first.

In lieu of the sine wave oscillators 10, 22 in the intrusion detection system shown in FIG. 1, any type of signal generators may be used which produce a periodic waveform having a repetition rate $f_p$ Hz. The frequency band of this waveform, however, must not overlap the frequency band of the transmitted data.

Moreover, in addition to the avalanche photodetector, the receiver photodetector may comprise any device which produces an electrical output proportional to the total intensity of all incident optical signals.

While in accordance with the provisions of the patent statute the preferred forms and embodiments of the invention have been illustrated and described, it will be apparent to those skilled in the art that various changes or modifications may be made without deviating from the inventive concepts set forth below.

What is claimed is:

1. An intrusion detection optical system, comprising
    (a) first means for generating a combined multiplexed data and periodic subcarrier alarm waveform optical signal;
    (b) optical fiber means connected with said first generating means for transmitting said combined signal; and
    (c) means connected with said optical fiber means for receiving said combined signal, said receiving means including
        (1) second means for generating a local optical signal including a periodic wave component matched with the periodic subcarrier alarm waveform of said transmitted combined signal;
        (2) means for combining said transmitted and local optical signals to produce a composite output signal;
        (3) filter means connected with said combining means for passing only non-zero periodic wave components from said composite output signal; and (4) means connected with said filter means for detecting and indicating the presence of non-zero periodic wave components above a threshold value as a result of an intrusion into said optical fiber means.

2. Apparatus as defined in claim 1, wherein said periodic waveform comprises a sine wave.

3. Apparatus as defined in claim 2, wherein said first generating means includes a multiplexer for multiplexing the data to be transmitted to produce a multiplexed data signal.

4. Apparatus as defined in claim 3, wherein said first generating means includes a first oscillator for delivering a sync signal to said multiplexer for multiplexing with the data.

5. Apparatus as defined in claim 4, wherein said first oscillator also produces a sine wave signal, and further comprising first adder means connected with said multiplexer and said first oscillator for combining said multiplexed data and sync signals with said sine wave signal.

6. Apparatus as defined in claim 5, and further comprising
(1) a power source having an output connected with said adder; and
(2) an optical source connected with said adder for converting said combined multiplexed data and sync, DC, and sine wave signals to optical form and for delivering said optical signal to said optical fiber means.

7. Apparatus as defined in claim 6, wherein said receiver means includes a demultiplexer for demultiplexing said combined multiplexed data and sync, and sine wave optical signals to separate the transmitted data therefrom.

8. Apparatus as defined in claim 7, wherein said local optical signal generating means includes
(1) a phase locked oscillator connected with said demultiplexer for generating said matched sine wave component;
(2) second adder means connected with said phase locked oscillator;
(3) a second power source connected with said second adder means, whereby said second adder means combines an output power signal from said second power source with said matched sine wave component; and
(4) a second optical source connected with said second adder for converting said combined power signal and matched sine wave component into optical form.

9. Apparatus as defined in claim 8, wherein said means for combining said transmitted and local optical signals comprises an avalanche photodiode.

10. Apparatus as defined in claim 9, wherein said filter means comprises a bandpass filter having a passband centered at a given frequency.

11. Apparatus as defined in claim 10, wherein said detecting and indicating means comprises
(1) a synchronous detector having one input connected with said bandpass filter and a second input connected with said phase locked oscillator; and
(2) an alarm circuit connected with said synchronous detector.

12. Apparatus as defined in claim 11, and further comprising a delay circuit connected between said demultiplexer and said phase locked oscillator for delaying the input to said phase locked oscillator.

13. Apparatus as defined in claim 12, and further comprising an inverting amplifier connected between said phase locked oscillator and said second adder for inverting the matched sine wave components from said phase locked oscillator.

14. Apparatus as defined in claim 1, wherein said fiber means affords bidirectional communication to provide duplex operation.

15. A method for detecting intrusions in an optical communication system, comprising the steps of
(a) generating a combined multiplexed data and periodic subcarrier alarm waveform optical signal;
(b) transmitting said combined signal;
(c) demultiplexing said transmitted combined signal at a receiver to extract the data therefrom;
(d) generating a feedback periodic waveform optical signal within said receiver corresponding with said transmitted periodic waveform optical signal;
(e) combining said feedback and transmitted periodic waveform to obtain a normally nulled waveform condition; and
(f) detecting a disruption from said normally nulled waveform condition above a threshold value as a result of an intrusion into the optical communication system.

* * * * *